United States Patent Office 3,190,865
Patented June 22, 1965

3,190,865
CHLOROPRENE POLYMERIZATION PROCESS
Kenneth L. Miller, Lyndon, Ky., assignor to E. I. du Pont de Nemours and Company, Wilmington, Del., a corporation of Delaware
No Drawing. Filed Nov. 2, 1961, Ser. No. 149,508
8 Claims. (Cl. 260—92.3)

This invention relates to a process for polymerizing chloroprene and more particularly to the improved process for the polymerization of chloroprene in the presence of a dialakyl xanthogen disulfide.

Chloroprene polymers of low molecular weight and relatively low viscosity may be prepared by polymerizing chloroprene in the presence of a sufficient amount of a dialkyl xanthogen disulfide. These low-molecular-weight polymers are especially useful as plasticizers for higher-molecular-weight chloroprene polymers because they can be co-cured therewith. However, it is important that these more fluid polymers themselves cure to vulcanizates having good tensile properties if the tensile properties of the polymers into which they are incorporated are not to be adversely affected.

Dialkyl xanthogen disulfides have been used as modifying agents in polymerizing chloroprene to low-molecular-weight polymers; however, the polymerization must be carried out under carefully controlled conditions if the resulting vulcanizates are to have satisfactory tensile strength. These conditions include a pH of about 5 to 11 and a temperature of about 15 to 25° C. Since the dialkyl xanthogen disulfides tend to retard polymerization, it is difficult to initiate and maintain polymerization under these conditions using conventional initiation techniques.

It is an object of the present invention to provide an improved process for the polymerization of chloroprene in the presence of a dialkyl xanthogen disulfide. A further object is to provide such a process which results in the production of relatively low molecular weight polymers whose vulcanizates have excellent tensile properties. Other objects will appear hereinafter.

These and other objects are accomplished by polymerizing chloroprene in an aqueous emulsion in the presence of from about 0.01 to 0.04 part mole per 100 parts by weight of chloroprene of a dialkyl xanthogen disulfide wherein the alkyl groups contain from 1 to 8 carbon atoms with the proviso that the polymerization be carried out at a temperature of from about 15 to 25° C. at a pH of from about 5 to 11 in the presence of a catalyst system comprising per 100 parts by weight of chloroprene
  (a) About 0.00065 to about 0.0013 part mole of an organic hydroperoxide,
  (b) About 0.1 to 0.3 part by weight of an inorganic water-soluble persulfate, and
  (c) At least about 0.05 part by weight of a compound selected from the group consisting of an inorganic water-soluble hydrosulfite and an inorganic water-soluble pyrosulfite, with the further proviso that components (a) and (b) of said catalyst system be added separately to the polymerization system before polymerization is initiated, with polymerization then being initiated and maintained by the addition of component (c).

The term "chloroprene" means the compound 2-chloro-1,3-butadiene. In order to obtain products having optimum tensile strength it is preferred that chloroprene be polymerized with no other copolymerizable monomer present. However, it is to be understood that the polymerization system may contain up to 10 percent by weight, based on total monomer content, of another copolymerizable compound containing the group $CH_2=C<$. These include vinyl-substituted aromatic compounds, such as styrene, vinyltoluenes, and vinylnaphthalenes; acrylic and methacrylic acid esters and nitriles, such as methyl methacrylate and acrylonitrile; and conjugated diolefinic compounds such as 1,3-butadiene, isoprene, and 2,3-dichloro-1,3-butadiene.

The dialkyl xanthogen disulfides which are used in practicing this invention have the formula

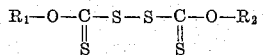

in which $R_1$ and $R_2$ are alkyl groups containing from one to eight carbon atoms. The preferred alkyl groups are those having three to four carbon atoms. At least about 0.01 part mole of the dialkyl xanthogen disulfide per 100 parts by weight of chloroprene is required to obtain a polymer having a sufficiently low molecular weight to be useful as a plasticizing agent for more solid polymers. If more than about 0.04 part mole is used the resulting polymer will not cure to a vulcanizate having satisfactory tensile strength. The preferred amount is about 0.015 to 0.025 part mole. The term "part mole" means that the molecular weight of the particular disulfide used is calculated in the same units as the amount of chloroprene. In other words, if the parts of chloroprene used are figured in terms of grams or pounds, the molecular weight of the dislufide is calculated in terms of grams or pounds and from about 1 percent to 4 percent of this amount of disulfide is used.

The polymerization is carried out in aqueous emulsion using any of the conventional emulsifying agents used in chloroprene polymerizations. These include water-soluble salts of compounds of the following types: long-chain fatty acids; dimerized fatty acids; rosins and modified rosins or partially polymerized rosins; fatty alcohol sulfates; and arylsulfonic acids or formaldehyde condensates thereof, such as nonylbenzenesulfonic acid or the formaldehyde condensation product of naphthalenesulfonic acid.

It has been found that the dialkyl xanthogen disulfides act most effectively when the pH of the polymerization system is between about 5 and 11. If the pH is outside this range the polymers produced will have too high a viscosity to be satisfactory for use as plasticizers for more solid polychloroprenes. The preferred pH range is about 6 to 10.

In order to obtain polymers which cure to the maximum tensile strength it is essential to carry out the polymerization at a temperature in the range of about 15° C. to about 25° C. Below about 15° C. polymerization is inconveniently slow. Above about 25° C. the polymers prepared cure to vulcanizates having poorer tensile strength.

As indicated above, the catalyst system apart from the dialkyl xanthogen disulfide modifying agent comprises three essential components. These are the organic hydroperoxide, the inorganic water-soluble persulfate and the inorganic water-soluble hydrosulfite or pyrosulfite. Any organic hydroperoxide may be employed in this catalyst system. Of particular value are the organic hydroperoxides which contain from about 4 to 21 carbon atoms. A representative class of hydroperoxides is the tertiary organic hydroperoxides which correspond to the formula

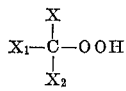

wherein $X$, $X_1$ and $X_2$ are independently selected from the group consisting of aliphatic acyclic, aliphatic cyclic, aryl, alkaryl and aralkyl radicals, with the proviso that two or three of the X's together with the carbon atom attached to the hydroperoxy group may be joined to form a ring system containing from 1 to 2 rings with each ring containing from 5 to 6 carbon atoms and with the further proviso that the carbon atom directly attached to the hydroperoxy group is not part of an aromatic ring. Examples of suitable organic hydroperoxides include cumene hydroperoxide, ($\alpha,\alpha$-dimethylbenzyl hydroperoxide), tert-butyl hydroperoxide, diisopropylbenzene hydroperoxide, pinane hydroperoxide, menthane hydroperoxide (which is the hydroperoxide of 1-isopropyl-4-methyl cyclohexane) and p-dodecyl $\alpha,\alpha$-dimethylbenzyl hydroperoxide. Another group of suitable hydroperoxides is the ketone peroxides such as cyclohexanone peroxide and methyl ethyl ketone peroxide. Methyl ethyl ketone peroxide, for example, is a mixture consisting predominantly of

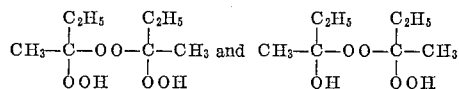

It is to be understood that mixtures of these peroxides may be used. At least about 0.00065 part mole of the hydroperoxide, per 100 parts by weight of chloroprene, is required to initiate polymerization. If more than about 0.0013 part mole is used, the polymerization proceeds too rapidly to be controlled.

The water-soluble inorganic persulfates that may be used are preferably the sodium, potassium, or ammonium salts of persulfuric acid. The amounts of this salt to be used can be varied from about 0.1 to about 0.3 part by weight per 100 parts by weight of chloroprene. The polymerization proceeds too slowly when less than 0.1 part is used and the polymerization is hard to control when more than 0.3 part is used. Mixtures of these persulfates may be used.

Component (c) of the catalyst system is a water-soluble inorganic hydrosulfite or pyrosulfite or mixtures thereof. Because of their ready availability, the sodium salts are preferred. Sodium hydrosulfite (also called sodium dithionite) is available as the dihydrate ($Na_2S_2O_4 \cdot 2H_2O$). The amount of at least 0.05 part by weight to be used refers to the anhydrous material. Sodium pyrosulfite (also called sodium metabisulfite) has the formula $Na_2S_2O_5$. The quantity of this component will vary somewhat depending on the activity of individual lots of chloroprene monomer. In general, at least a total of about 0.05 part by weight, per 100 parts by weight of chloroprene, is required to initiate and maintain polymerization at a satisfactory rate. The preferred range is from about 0.06 to about 0.12 part. Usually no more than 0.5 part by weight of the salt per 100 parts by weight of chloroprene is required to initiate and maintain polymerization. A preferred method is to initiate polymerization by adding 50 to 90 percent of the salt all at once and then to maintain polymerization at the desired rate by gradual addition of the salt as required.

In practicing the process of this invention, an aqueous emulsion is prepared, by conventional techniques, containing the chloroprene, the dialkyl xanthogen disulfide, the emulsifying agent, and water. The chloroprene content of the aqueous emulsion is not critical, but usually ranges from 30 to 60 percent by weight of the total weight of the emulsion. It is usually convenient to incorporate the organic hydroperoxide into the aqueous emulsion of the chloroprene. As usual in chloroprene polymerizations, oxygen is excluded from the atmosphere above the polymerization medium. This is conveniently done by sweeping the reaction vessel with a stream of an inert gas, such as nitrogen, and maintaining a nitrogen atmosphere over the polymerization medium. The temperature is adjusted by conventional methods to about 15 to 25° C.

To the chloroprene emulsion is then added the persulfate, perferably as a water solution. Optionally, this water solution may contain also a small amount of the sodium salt of 2-anthraquinonesulfonic acid. This is not an essential part of this invention but merely provides an additional activation to allow for possible variations in activity of individual lots of chloroprene monomer.

Polymerization is then initiated by addition of the hydrosulfite or pyrosulfite. This salt may be added initially either as a solid or as an aqueous solution. To maintain the desired polymerization rate, subsequent amounts are conveniently added in the form of an aqueous solution.

When the desired chloroprene conversion has been attained, polymerization is stopped in the usual manner by adding conventional short-stopping agents, for example as described in U.S. 2,576,009. If desired, unreacted chloroprene may be removed by known methods, for example as described in U.S. 2,467,769. The polymer may be isolated by known techniques such as by drum drying, as described in U.S. 2,914,497, or by coagulation of the solid polymer and separation from the aqueous phase.

When the polymers of this invention are first isolated they are quite fluid, with Brookfield viscosities at 60° C. in the range of about 350,000 to 1,200,000 centipoises. However, they crystallize rapidly and in a day or two they have become crumbly, elastic solids having a factice-like consistency. However, they can be returned to their fluid state by warming at 60° C. Using conventional polychloroprene curing methods, they may be cured to vulcanizates having excellent tensile strength. These properties make them eminently suitable for use as plasticizing agents for more solid chloroprene polymers.

The following examples will better illustrate the nature of the present invention; however, the invention is not intended to be limited to these examples. Parts are by weight unless otherwise indicated.

*Example 1*

An emulsion is prepared using the following recipe:

| | Parts by weight |
|---|---|
| Chloroprene | 100. |
| Diisopropyl xanthogen disulfide | 4.7 (0.017 part mole). |
| Oleic acid | 3.8. |
| $\alpha,\alpha$-Dimethylbenzyl hydroperoxide (cumene hydroperoxide) | 0.14 (0.00092 part mole). |
| Sodium hydroxide | 0.24. |
| Water | 133.33. |

Emulsification is effected by mixing the chloroprene, the diisopropyl xanthogen disulfide, the oleic acid, and the cumene hydroperoxide, and emulsifying this mixture with the water solution of the sodium hydroxide. Emulsification is effected under nitrogen. The pH of the system is 9. An atmosphere of nitrogen is maintained in the polymerization vessel and mild agitation is maintained throughout the polymerization process.

To the emulsion so prepared is added a solution of the following composition:

| | Parts by weight |
|---|---|
| Ammonium persulfate | 0.20 |
| Sodium 2-anthraquinone sulfonate | 0.006 |
| Water | 5.0 |

Up to this time no polymerization has taken place. Polymerization is now initiated by adding 0.067 part by weight (based on 100 parts by weight of chloroprene) of solid sodium hydrosulfite dihydrate to the system (0.056 part on an anhydrous basis). Thereafter, polymerization is maintained by the addition, as needed, of a solution containing 0.01 part by weight of sodium hydrosulfite dihydrate, 0.0002 part of sodium hydroxide, and 0.23 part of water. The rate of polymerization is such as to give an increase in specific gravity of about 0.0005 g./cc. per minute.

Polymerization is stopped when the specific gravity of the latex is 1.063 at 20° C. (a chloroprene conversion of 82 percent) by addition of 0.015 part of phenothiazine and 0.015 part of 4-tert-butylcatechol dissolved in toluene and emulsified in water containing as emulsifying agents the sodium salt of a formaldehyde-naphthalenesulfonic acid condensate and sodium lauryl sulfate.

The polymer is isolated by drum drying, which is carried out on an 8-inch chromium-plated, double drum drier, using a drum speed of 20 r.p.m. and a steam pressure of 80 p.s.i.g. The latex is introduced continuously into the nip between the rolls. The polymer is removed from the rolls by "doctor knives."

The polymer, when first isolated, is a fluid having a Brookfield viscosity at 60° C. of about 470,000 cps. However, it crystallizes rapidly and in two days it has become a crumbly, elastic, solid having a factice-like consistency. It can be returned to its fluid state by warming to 60° C.

The polymer is compounded using the following recipe:

| | Parts by weight |
|---|---|
| Polymer | 100 |
| N-phenyl-2-naphthylamine | 2 |
| Intermediate super abrasion furnace black | 10 |
| Magnesium oxide | 4 |
| Zinc oxide | 10 |
| Di-o-tolylguanidine | 3 |
| Monoethanolamine | 4.1 |

Cure is effected by heating at 152° C. for 5 minutes in an open mold and for 15 minutes in a closed mold under a pressure of 445 p.s.i. The tensile properties, measured by ASTM Method D 412–51 T, are:

| | |
|---|---|
| Modulus at 400% elongation, p.s.i. | 1450 |
| Tensile strength at the break, p.s.i. | 2170 |
| Elongation at the break, percent | 505 |

Similar results are obtained when the diisopropyl xanthogen disulfide is replaced by one of the following:

Diethyl xanthogen disulfide
Dibutyl xanthogen disulfide
Dis(2-ethylhexyl) xanthogen disulfide

*Examples 2 and 3*

Polymerizations are carried out as described in Example 1 except that different amounts of diisopropyl xanthogen disulfide are used. The polymers are compounded and cured as described in Example 1 except that the compounding recipe contains 20 parts of easy processing channel black instead of 10 parts of intermediate super abrasion furnace black.

The following table summarizes the data:

| Ex. | Diisopropyl xanthogen disulfide | | Brookfield viscosity at 60° C. of isolated polymer, cps. | Tensile strength at break of cured polymer, p.s.i. |
|---|---|---|---|---|
| | Parts | Part Moles | | |
| 2 | 5.0 | 0.0185 | 450,000 | 2,100 |
| 3 | 5.4 | 0.020 | 350,000 | 2,100 |

*Examples 4–6*

Polymerizations are carried out as described in Example 1 except that in each example an equimolar amount of a different peroxide (0.00092 part mole) is used instead of cumene hydroperoxide. The polymerization proceeds as described in Example 1. The following hydroperoxides are used:

| Example | Hydroperoxide | Brookfield Viscosity at 60° C. of freshly isolated polymer |
|---|---|---|
| 4 | Diisopropylbenzene hydroperoxide | 630,000 |
| 5 | Pinane hydroperoxide | 470,000 |
| 6 | Methyl ethyl ketone peroxide | 1,160,000 |

*Example 7*

A polymerization is carried out as described in Example 1 except that sodium pyrosulfite is used instead of sodium hydrosulfite. Polymerization is initiated by adding 0.067 part by weight of sodium pyrosulfite. Polymerization is thereafter maintained by the addition, as needed, of a solution containing 0.01 part of sodium pyrosulfite, 0.0002 part of sodium hydroxide, and 0.23 part of water. The isolated polymer has a Brookfield viscosity at 60° C. of 600,000.

The polymer is compounded and cured as described in Example 1 except that medium thermal carbon black is used instead of the intermediate super abrasion furnace black. The tensile strength at the break of the cured polymer is 2400 p.s.i. (ASTM Method D 412–51 T).

As many widely different embodiments of this invention may be made without departing from the spirit and scope thereof, it is to be understood that this invention is not limited to the specific embodiments thereof except as defined in the appended claims.

What is claimed is:

1. In the polymerization of chloroprene in an aqueous emulsion in the presence of from 0.01 to 0.04 part mole per 100 parts of chloroprene of a dialkyl xanthogen disulfide wherein the alkyl groups contain from 1 to 8 carbon atoms, at a temperature of from about 15 to 25° C. and at a pH of from about 5 to 11, the improvement comprising carrying out the polymerization in the presence of a catalyst system comprising per 100 parts by weight of chloroprene
   (a) 0.00065 to 0.0013 part mole of an organic hydroperoxide,
   (b) 0.1 to 0.3 part by weight of an inorganic water-soluble persulfate, and
   (c) at least 0.05 part by weight of a compound selected from the group consisting of an inorganic water-soluble hydrosulfite, an inorganic water-soluble pyrosulfite and mixtures thereof;
with the proviso that components (a) and (b) of said catalyst system be added separately to the polymerization system before polymerization is initiated with polymerization then being initiated and maintained by the addition of component (c).

2. The process of claim 1 wherein the organic hydroperoxide contains from about 4 to 21 carbon atoms.

3. The process of claim 2 wherein the organic hydroperoxide is α,α-dimethylbenzyl hydroperoxide.

4. The process of claim 3 wherein the dialkyl xanthogen disulfide is diisopropyl xanthogen disulfide.

5. The process of claim 4 wherein component (c) of the catalyst system is sodium hydrosulfite.

6. The process of claim 4 wherein component (c) of the catalyst system is sodium pyrosulfite.

7. The process of claim 5 wherein the inorganic water-soluble persulfate is ammonium persulfate.

8. The process of claim 1 wherein chloroprene is polymerized with up to 10% by weight, based on total monomer content, of another copolymerizable monomer.

References Cited by the Examiner

UNITED STATES PATENTS

| | | | |
|---|---|---|---|
| 2,321,693 | 6/43 | Meisenburg et al. | 260—92.3 |
| 2,494,087 | 1/50 | Daniels | 260—92.3 |
| 2,614,098 | 10/52 | Uraneck et al. | 260—92.3 |
| 3,013,000 | 12/61 | Heinz et al. | 260—92.3 |

LEON J. BERCOVITZ, *Primary Examiner.*

H. N. BURSTEIN, *Examiner.*